United States Patent

[11] 3,627,617

| [72] | Inventors | Edward G. Schaumburg<br>Oakdale Village;<br>Donald T. Nordvik, Brooklyn Park; Peter<br>A. Recht, Bloomington, all of Minn. |
|---|---|---|
| [21] | Appl. No. | 800,492 |
| [22] | Filed | Feb. 19, 1969 |
| [45] | Patented | Dec. 14, 1971 |
| [73] | Assignee | Gould-National Batteries, Inc.<br>St. Paul, Minn. |

[54] BATTERY CONTAINER ASSEMBLY STATION
20 Claims, 13 Drawing Figs.

[52] U.S. Cl. .................................................. 156/566,
156/583, 136/176
[51] Int. Cl. ..................................................... B65h 1/14,
B30b 15/34, H01m 35/18

[50] Field of Search............................................ 156/566,
583, 362, 363, 306

[56] References Cited
UNITED STATES PATENTS

| 3,251,723 | 5/1966 | McAlpine et al. ............ | 156/583 X |
| 3,384,524 | 5/1968 | Hansen, Jr. ................... | 156/566 X |
| 3,480,503 | 11/1969 | Morrow et al. ............... | 156/363 X |

*Primary Examiner*—Samuel Feinberg
*Assistant Examiner*—J. J. Devitt
*Attorney*—Stryker and Jacobson

ABSTRACT: A battery container assembly station having an automated battery cover dispensing mechanism for supplying battery covers to a heat sealing mechanism for forming an acid proof heat seal between the battery cover and the container.

INVENTORS
EDWARD G. SCHAUMBURG
DONALD T. NORDVIK
PETER A. RECHT

BY *Stephen & Jacobson*

ATTORNEYS

BATTERY CONTAINER ASSEMBLY STATION

BACKGROUND OF THE INVENTION

1. Field of the Invention

This invention relates generally to battery container assembly stations and, more specifically, to a cover dispensing mechanism for plastic batteries and an automated heat sealing unit for plastic batteries.

2. Brief Description of the Prior Art

Apparatus for manufacturing hollow plastic bodies such as bottles, dolls and practice golf balls is well known in the art. The application of identical or similar apparatus and techniques for heat sealing and assembling a polypropylene battery cover and a polypropylene battery container is not possible because of the inherently different nature of a battery.

Because of the corrosive electrolyte (generally sulphuric acid) in a battery, there must be an acid-proof joint between the storage battery cover and the container to prevent leakage or spillage of the corrosive electrolyte. Hence there is a need for a sealing unit that produces a reliable acid-proof joint between the battery cover and the container. In addition, generally the last step in manufacturing a plastic battery is sealing the battery cover to the container. If the joint between the cover and container is not free from defects all the previous work done in assembling the battery grids, plates, terminals, connection between cells, etc. is wasted because the leaky battery cannot be used. This is obviously costly and undesirable. In order to produce an acid-proof joint between cover and container, the mechanism for handling the battery covers must ensure: that the edges of the cover and the edges of the container which are to be joined in the heat sealing process are heated to the proper temperature before sealing; that the cover is positioned properly before sealing; and that the pressure applied to the cover and container during sealing is sufficient so as to produce an acid-proof joint and not so great as to crush the container. Furthermore, the platen for heating the edges of the battery cover and the edges of the container must not cause the edges of the cover or the container to stick to the platen and come off with a stringy appearance which would not only mar the appearance of the container but also would weaken or ruin the acid-proof joint between cover and container. Also there must be provided suitable means to accurately and securely hold the battery cover while it is being heated and while it is being sealed to the container.

The assembly station must also provide some means for checking the steps necessary for sealing a battery cover to a container in order to determine if they have all been properly carried out because if any one of them has failed, then the whole battery must be rejected. Furthermore, these sealing stations and cover dispensing mechanisms must be readily adaptable to accommodate the many different sizes and shapes of battery containers that a battery manufacturer is required to make for today's vehicles and machines.

We have invented apparatus which overcomes these prior art deficiencies and produces an acid-proof joint between the cover and container in a reliable and efficient manner while having the versatility to accommodate the manufacturing of the many different sizes and shapes of batteries on the market today.

SUMMARY

Briefly, the present invention comprises means for holding a plurality of battery covers so as to readily place one of the covers onto a slidable heating platen that heats the edges of the cover and the edges of the container and further means for bringing the heated edges of the battery cover into pressure contact with the heated edges of the container thereby producing an acid-proof heat sealed joint between the battery cover and container. BRIEF DESCRIPTION OF THE DRAWING FIG. 1 is a side elevation view of an embodiment of our invention showing the sealing unit and cover dispensing mechanism partially in section;

DESCRIPTION OF THE HEAT SEALING STATION

Figure 1:
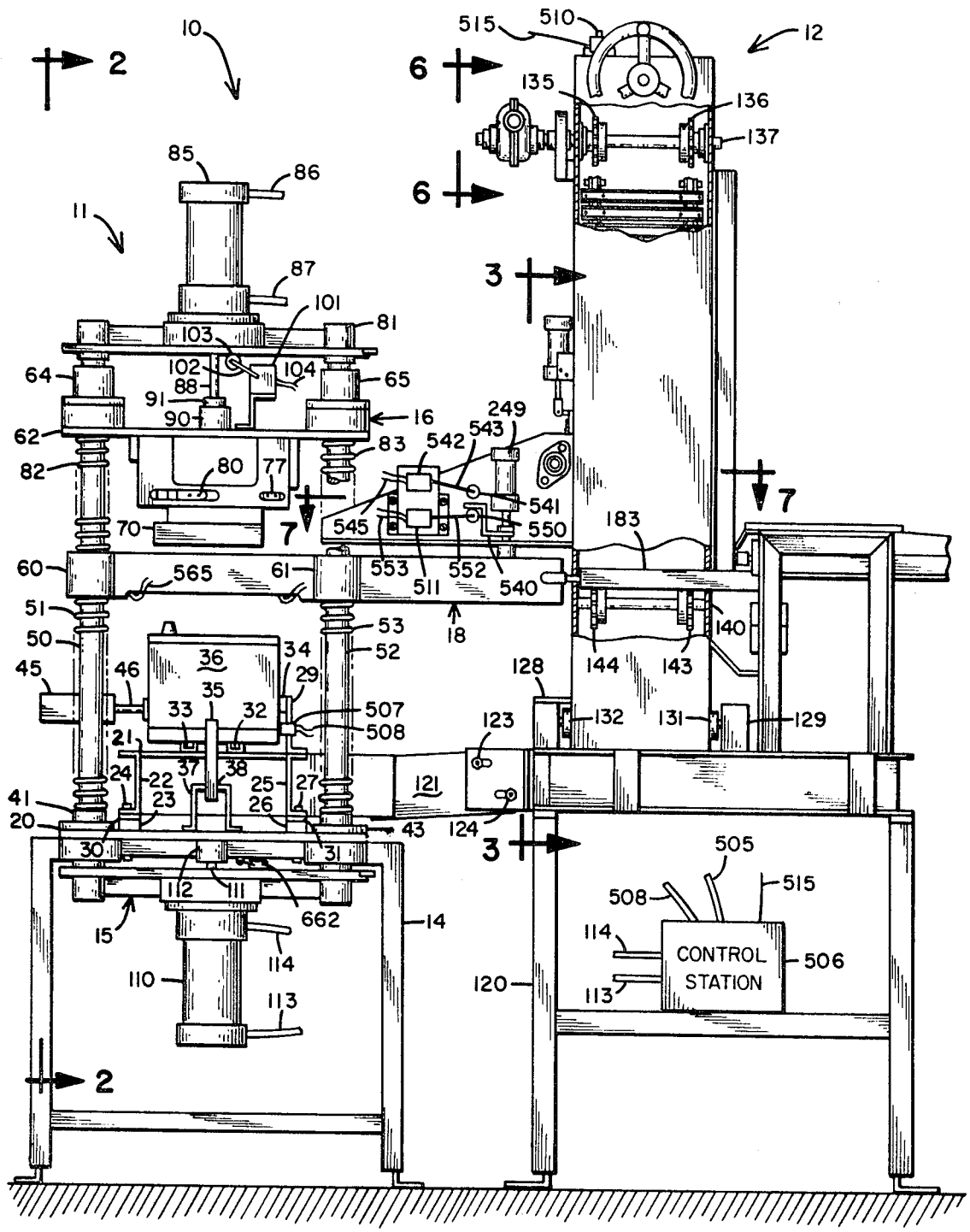
Figure 2:
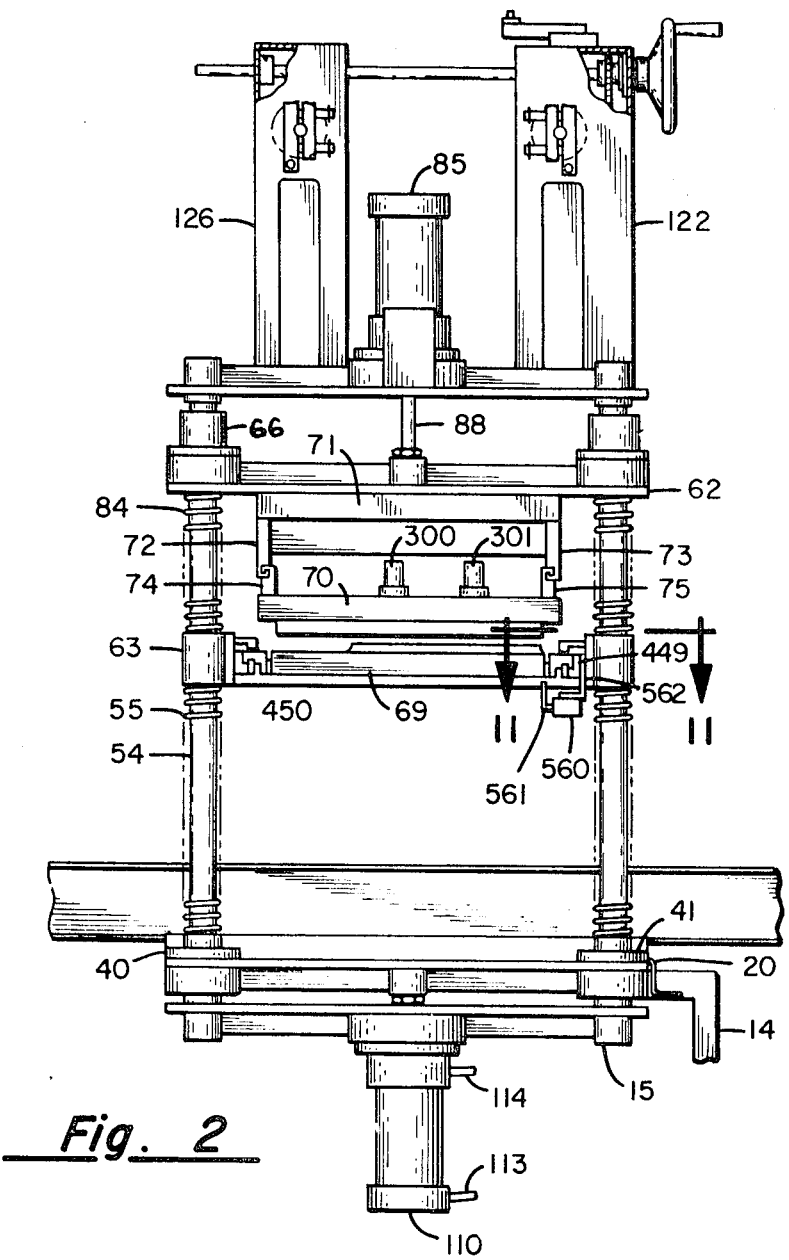
FIG. 2 is a fragmentary front elevation view showing the relation of the heating platen and cover holder of the unit together with the top portion of the cover dispensing mechanism.

Referring to FIGS. 1 and 2, reference numeral 10 generally designates our sealing system comprising a heat sealing station 11 and a cover dispensing mechanism 12.

Briefly, sealing station 11 contains a first means for sliding a battery cover into station 11, a second means for engaging the battery cover, a third means for lowering the battery cover onto the container and fourth means for heating the edges of the battery cover and the edges of the container to a fusible condition.

Sealing station 11 comprises a support stand 14, a bottom vertically slidable member 15, a top vertically slidable member 16 and a vertically movable platen carrier 18.

Fastened rigidly to support stand 14 is a substantially rectangular bottom member 20. Support stand 14 contains a battery support comprising a plate 21 that fastens to bottom member 20 through a channel iron 22, a ridge member 23, a bolt 24 and a beveled spacer 30. Plate 21 also fastens to bottom member 20 through a channel iron 25, a ridge member 26, a bolt 27 and a beveled spacer 31. To raise or lower plate 21 one places more or less space between channel iron 22 and 25 and ridge members 23 and 26. Located on top plate 21 is a first battery support rail 32 and a second battery support rail 33 that hold a battery 36 in a horizontal plane. Support rails 32 and 33 may contain conveyor chains for moving battery 36 in and out of heat sealing station 11 or they may also act as slide rails for sliding battery 36 in and out of station 11. Located along the back side of battery 36 and connected to plate 21 is a back plate 29 having a guide rail 34 thereon for positioning the battery in a first vertical plane. Located along the side of battery 36 and connected to bottom member 20 is a stop 35 for positioning battery 36 in a second vertical plane. Stop 35 is pivotally mounted on a support 37 through a hinge 38. Support 37 fastens rigidly to member 20 through fastening means (not shown) such as bolts. A member (not shown) holds stop 35 in the position shown in FIGS. 1 so that battery 36 is firmly held from movement in the second vertical plane. Located in front of sealing station 11 is a pressure actuated member 45 having an extendible pusher 46 for holding battery 36 securely against back guide rail 34. Member 45 is necessary to prevent battery 36 from moving during the heat sealing operation.

Bottom slidable member 15 has four posts that attach thereto and extend in a slidable relationship through four sleeves in stand 14. Located in a slidable relationship within a sleeve 41 is a post 50 having a spring 51 located thereon. Similarly, located in a slidable relationship within a sleeve 43 is a post 52 with a spring 53 located thereon. Located in a slidable relationship within a sleeve 40 is a post 54 having a spring 55 therearound. Post 50, post 52, post 54 and the fourth post (not shown) support movable platen carrier 18 over bottom slidable member 15. Movable platen carrier 18 is slidable vertically along post 50, post 52, post 54 and the fourth post (not shown) respectively through a first sleeve 60, a second sleeve 61 and a third sleeve 63 and a fourth sleeve (not shown) located in movable platen carrier 18. The springs 51, 53, 55 and a fourth spring (not shown) exert a counterbalancing force in opposition to the weight of the movable platen carrier 18 and slidable member 15 thus holding the movable platen carrier 18 and slidable member 15 in the presealing position above battery 36 as shown in FIGS. 1 and 2.

Also located in a vertical slidable direction along the four posts is top vertical slidable member 16. Top slidable member 16 contains a rectangular plate member having a first sleeve 64, a second sleeve 65, a third sleeve 66 and a fourth sleeve (not shown) located in a slidable relation around post 50, post 52, post 54 and the fourth post (not shown). Located between movable platen carrier 18 are four springs, a first spring 82, a second spring 83, a third spring 84 and a fourth spring (not shown).

In order for an operator to manufacture batteries of different sizes or shapes, an operator can slide out a removable cover holding mechanism 70 which is slidably mounted to top plate member 62 through a hook shaped slide rail member 72 and a hook shaped rail member 73 which are rigidly fastened to plate member 62. Fastened to holding mechanism 70 are a pair of matching hook shaped slidable members 74 and 75 that slide within slide rail members 72 and 73. An adjustable stop 77 allows an operator to position the slidable cover holder 70 along slide rail members 72 and 73. A conventional spring catch mechanism 80 fastens into a slot in slidable member 75 to thereby accurately position and restrain cover holding mechanism 70 from sliding along rod members 72 and 73. Pulling outward on catch mechanism 80 frees cover holding mechanism from engagement with catch mechanism 80 and allows cover holding mechanism 70 to be slid forward and removed and replaced by a different cover holding mechanism. The purpose of the slide is to allow an operator to quickly remove and replace cover holding mechanism 70 when it is necessary to manufacture a different size or type battery. However, during operation of sealing unit 11 cover holding mechanism 70 remains firmly positioned with respect to top plate member 62 by catch mechanism 80.

Figure 11:
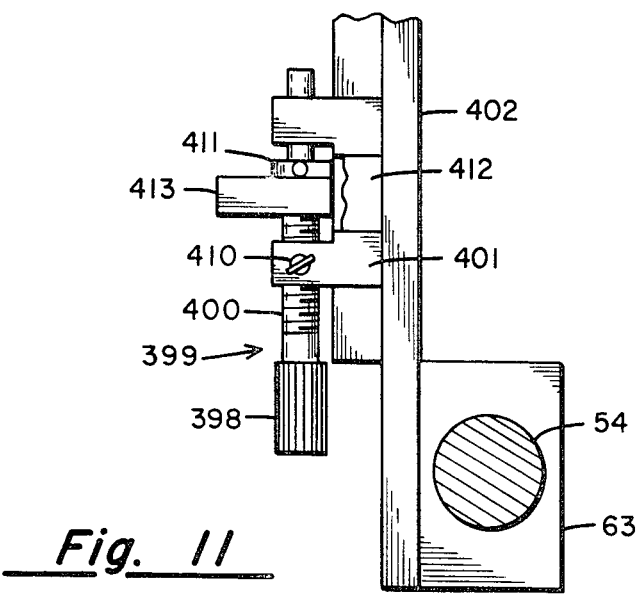
FIG. 11 is a fragmentary top view partially in cross section taken along the lines 11—11 of FIG. 2 showing the rail adjustment stop from the slidable heating platen.

Referring now to FIG. 11, an adjustable stop 399 for setting the forward position of the heating platen 69 as it moves under the cover holder and over the battery container is shown in greater detail. Stop 399 comprises a threaded shaft 400 which fits into a threaded support 401 that attaches to guide 402 and a knurled head 398 for turning shaft 400. The threads on shaft 400 are machine threads which are on the order of approximately 150 threads per inch. The fine threads allow an operator to produce small displacement of shaft 400 for relative large rotation of shaft 400. When an operator determines the desired position of shaft 400, he tightens a thumb screw 410 which secures threaded member 400 from rotating in support 401. The actual stop for the platen is provided by an elongated bar 413 on the straight portion of shaft 400, that is shown in the outward extending position in FIG. 11. Normally a spring 412 partially in section holds the support in the downward position. When an operator desires to replace the heating platen with a different size platen, such as when different size batteries are to be made, the operator rotates elongated stop 413 to the position shown in FIG. 11 thereby allowing platen 69 to slide freely underneath stop 413.

Figure 12:
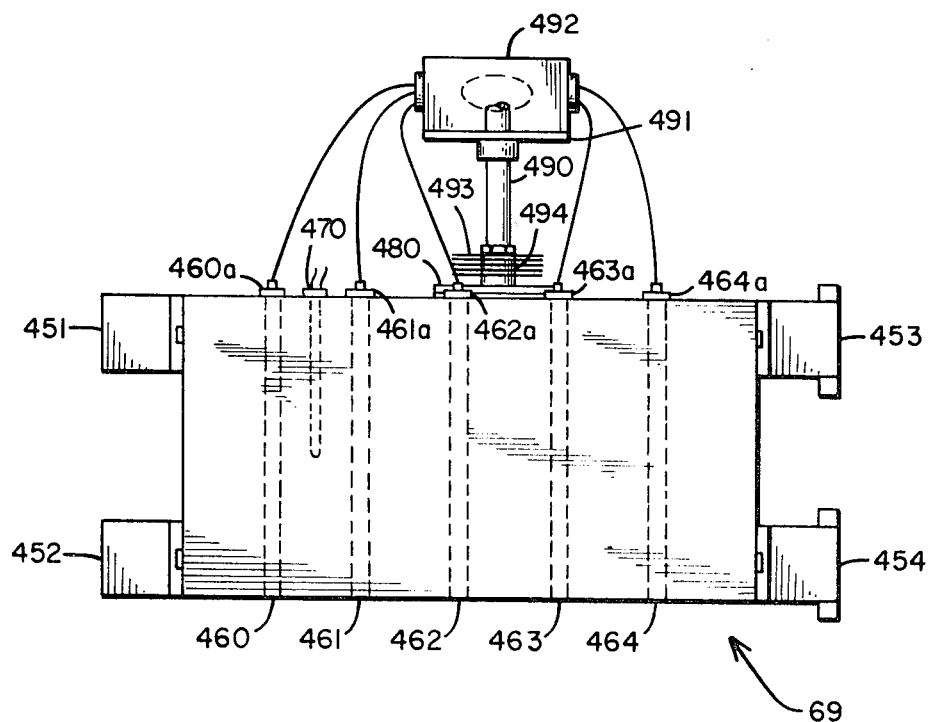
FIG. 12 is a top view of the heating platen for use in our invention.

Referring now to FIG. 12, heating platen 69 for the battery cover and battery container is shown alone. Located at the ends of platen 69 is a first runner 451, a second runner 452, a third runner 453 and a fourth runner 454. These runners support heating platen 69 in a slidable position along rails 450 and 449 of platen carrier 18 (FIG. 2). Platen 69 has a series of holes 460, 461, 462, 463 and 464 where cartridge heaters can be inserted.

These cartridge heaters ensure a proper heat distribution for heating platen 69. Located between hole 460 and hole 461 is a temperature sensor 470 that monitors the temperature of the platen. Temperature sensor 470 may be a thermocouple or the like which connects to a remote control box. Located on a rod 490 is a heat sink disc 493 and spacer 494 which dissipates excess heat from heating platen 69.

Referring to FIGS. 1 and 2, located above top slidable member 16 is a vertically displaceable member 81 which is rigidly fastened to posts 50, 52, 54 and the fourth post (not shown). Rigidly attached to vertically displaced member 81 is a pneumatic cylinder 85 for vertically displacing member 16 with respect to vertically displaced member 81. Pneumatic cylinder 85 has a first hose connection 86 and a second hose connection 87 and an extendible shaft 88 protruding from cylinder 85. Extendible shaft 88 has a threaded portion that rigidly fastens to plate member 62 by threaded recess in member 90. A nut 91 located on the threaded portion of shaft 88 securely holds shaft 88 in contact with member 90 thus providing rigid contact between plate member 62 and shaft 88. In operation, application of a predetermined high pressure pneumatic signal at hose connection 86 of cylinder 85 extends shaft 88 downward within pneumatic cylinder 85. This moves top slidable member 16 and vertically displaceable member 81 apart which lowers cover holding mechanism 70. Conversely, application of a predetermined high pressure pneumatic signal at hose connection 87 extends shaft 88 upward within cylinder 85 thereby moving top slidable member 62 and second top slidable member 81 together. As member 81 and member 16 move together it pushes a roller 103 and a lever arm 102 on a switch 101 downward thereby providing means for determining if member 16 and member 81 are positioned properly.

Referring to the lower portion of sealing station 11, there is shown a similar cylinder 110 which is rigidly attached to slidable member 15. Cylinder 110 has an extendible shaft 111 that abuts against a reinforcement plate 112 located on bottom member 20. In operation, application of a predetermined pressure signal at hose connection 113 extends shaft 111 upward within cylinder 110. Because bottom member 20 is rigidly mounted to stand 14, cylinder 110 moves downward lowering the top portion of heat sealing station including movable platen carrier 18 into an operable relation with respect to battery 36. By application of a predetermined high-pressure signal at a hose connection 114 causes shaft 111 to retract thereby returning the top portion of heat sealing station 11 to the position shown in FIGS. 1 and 2.

As the area of the movable pistons within cylinder 85 and 110 is constant, the selection of the pressure signals applied to the cylinders determine the forces produced for heat sealing the cover to the container. This ensures that application of a predetermined pressure consistently produces the same force for heat sealing the battery cover to the container. A typical example of the pressures and piston areas used are a pressure of 125 p.s.i. and a piston diameter of 4 inches.

DESCRIPTION OF THE COVER DISPENSING MECHANISM

Figure 4:
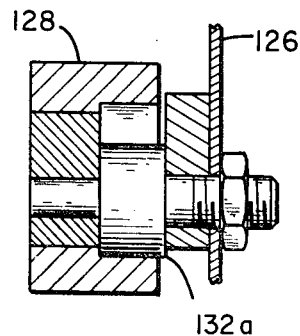
FIG. 4 is a cross-sectional view taken along lines 4—4 of FIG. 3 and shows a bottom slidable member that slides along the inside of a rail attached to the cover dispensing mechanism.
Figure 5:
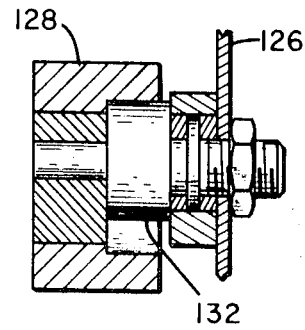
FIG. 5 is a cross-sectional view taken along lines 5—5 of FIG. 3 and shows a top slidable member that slides along the inside of a rail attached to the cover dispensing mechanism.

Briefly, cover dispensing mechanism 12 provides a chain rack for storing a number of covers and a pressure actuated means for dispensing a single cover onto a movable platen carrier wherefrom the cover is moved into the heat sealing station. FIG. 1 shows cover dispensing mechanism 12 mounted on stand 120 which fastens to stand 14 through a cross-tie member 121. Cross-tie member 121 is bolted to a bracket in a stand 120 by bolts 123 and bolts 124. Stand 120 rigidly supports a first vertical cover holding arm 122 and a second movable mounted cover holding arm 126. Cover holding arm 126 is movable in a horizontal plane through a cam member 132 and a cam member 132a (FIG. 4 and FIG. 5), which slidably engages a smooth track on the inside of guide arm 128. Located in a similar manner in guide arm 129 is a cam member 131 and a second cam member (not shown). The movable mounting of second arm 126 allows an operator to adjust the spacing between the cover holding arms to accommodate different size battery covers.

Figure 3:
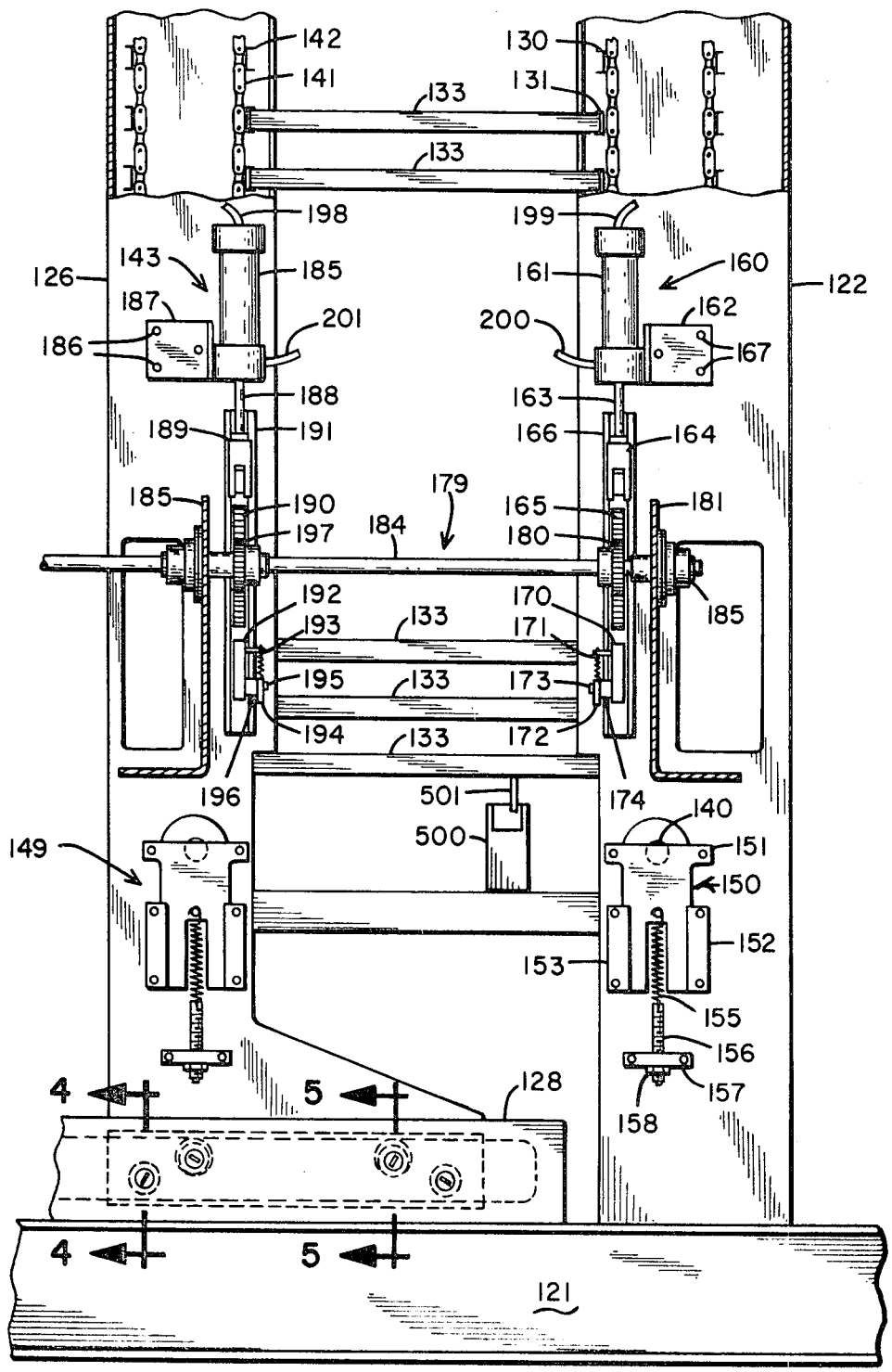
FIG. 3 is a fragmentary front elevation partially in section taken along lines 3—3 of FIG. 1 showing the cover advancing mechanism and the cover dispensing device.

Referring to FIG. 1 and FIG. 3, cover dispensing mechanism 12 is shown in greater detail. The cover holding arm 122 contains a first endless chain 130 having a number of U-shaped links 131 attached thereto. The open portions of U-shaped links 131 fit over one end of a battery cover. (Because the battery covers are identical, they are all designated by reference numeral 133). Similarly, a second endless chain 141 having a number of identical U-shaped links 142 attached thereto supports the other end of battery cover 133.

A sprocket wheel 135 and a sprocket wheel 136 which are attached to a shaft 137, support the top portion of chain 130 and similarly, a sprocket wheel 143 and a sprocket wheel 144 attached to shaft 140 support the lower end of chain 130. In order to keep chain 130 in tension so the covers will be held in proper orientation, there is provided a pair of tensioning mechanisms 149 and 150. As both the mechanisms are identical, only tensioning mechanism 150 will be described. Tensioning mechanism 150 comprises a plate 151 located in a slidable relationship within a spacer guide 152 and a spacer guide 153. A spring 155 that is fastened to a rigidly mounted block 157 by a stud 156 and a nut 158 exerts a downward tensioning force on chain supporting shaft 140 through plate 150.

Figure 6:
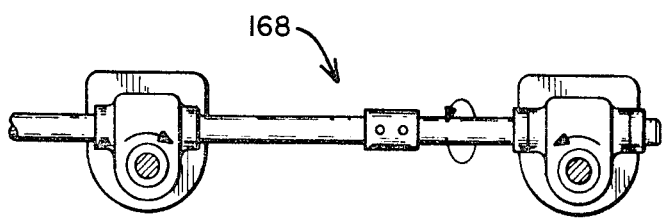
FIG. 6 is a fragmentary front view taken along lines 6—6 of FIG. 1 showing the right angle drive for maintaining cover holder chains of the cover dispensing mechanism in a uniform spaced relationship.

Chain 130 can be rotated in a counterclockwise direction through a ratchet mechanism 160 while chain 141 can be rotated in a clockwise direction through a ratchet mechanism 143. A right angle drive unit 168 (FIG. 6) maintains chain 130 and chain 141 in synchronization with one another so covers 133 are maintained in a horizontal orientation. Mechanism 160 comprises a hydraulic cylinder 161 that is fastened to cover guide 165 by a number of rivets 167 through a bracket 162 located on arm 122. Extending from cylinder 161 is a shaft 163 having a Y-shaped pusher 164 connected to gear rack 165. Gear rack 165 is located in a slidable relationship within track 166 so that vertical displacement of shaft 163 produces a corresponding vertical displacement of gear rack 165. Fastened on the bottom portion of the gear rack 165 is a pusher 170, a spring 171, a dog 172, a shoulder screw 173 and a spacer 174. The end of dog 172 engages the top of channel 131 located on chain 130 so that downward movement of shaft 163 and gear rack 165 pushes both dog 172 and the chain 130 downward at the same time. To ensure that both chains are advanced at the same time there is provided a spur gear mechanism 179 which is fastened to the cover dispensing mechanism 12 through bracket 181. As gear rack 165 moves downward it rotates a spur gear 180 in a spur gear mechanism 179. Rotation of spur gear 180 rotates a shaft 184 having a second spur gear 197 affixed thereto which coacts with mechanism 143 which will now be described.

Mechanism 143 is similar to mechanism 160 and comprises a hydraulic cylinder 185 that is fastened to cover guide 126 by a number of rivets 186 through a bracket 187 located on arm 126. Extending from cylinder 185 is a shaft 188 having a pusher 189 connected to a gear rack 190. Gear rack 190 is located in a slidable relationship within a track 191 so that vertical displacement of shaft 188 produces a corresponding vertical displacement of gear rack 190. Fastened on the bottom portion of gear rack 190 is a pusher 192, a spring 193, a dog 194, a shoulder screw 195 and a spacer 196. The end of dog 194 engages the top of channel 142 located on chain 141 so that downward movement of shaft 188 and gear rack 190 pushes both dog 194 and chain 141 downward at the same time. As gear rack 190 is mechanically connected to gear rack 165 through spur gear mechanism 179, it produces a uniform downward displacement of chain 141 and chain 130 which ensures that both chains are moved an equal distance downward. In operation, application of a signal at hose connection 18 of cylinder 185 and at hose connection 199 of cylinder 161 produces downward movement of shafts 188 and 163. Correspondingly, application of a pneumatic signal at hose connection 201 of cylinder 185 and at connection 200 of cylinder 161 produces an upward movement of shaft 188 and shaft 163. Downward motion of shaft 288 and shaft 163 causes dogs 172 and 194 to forcibly engage the top of the channels of the respective chains to thus push the chains downward. As shafts 188 and 163 are pulled upward the springs attached to dogs 172 and 194 allow the dogs to slide past the end of the channels without pushing the chains upward. Thus, only downward motion of shaft 188 and shaft 163 produces displacement of chain 130 and chain 141.

Figure 7:
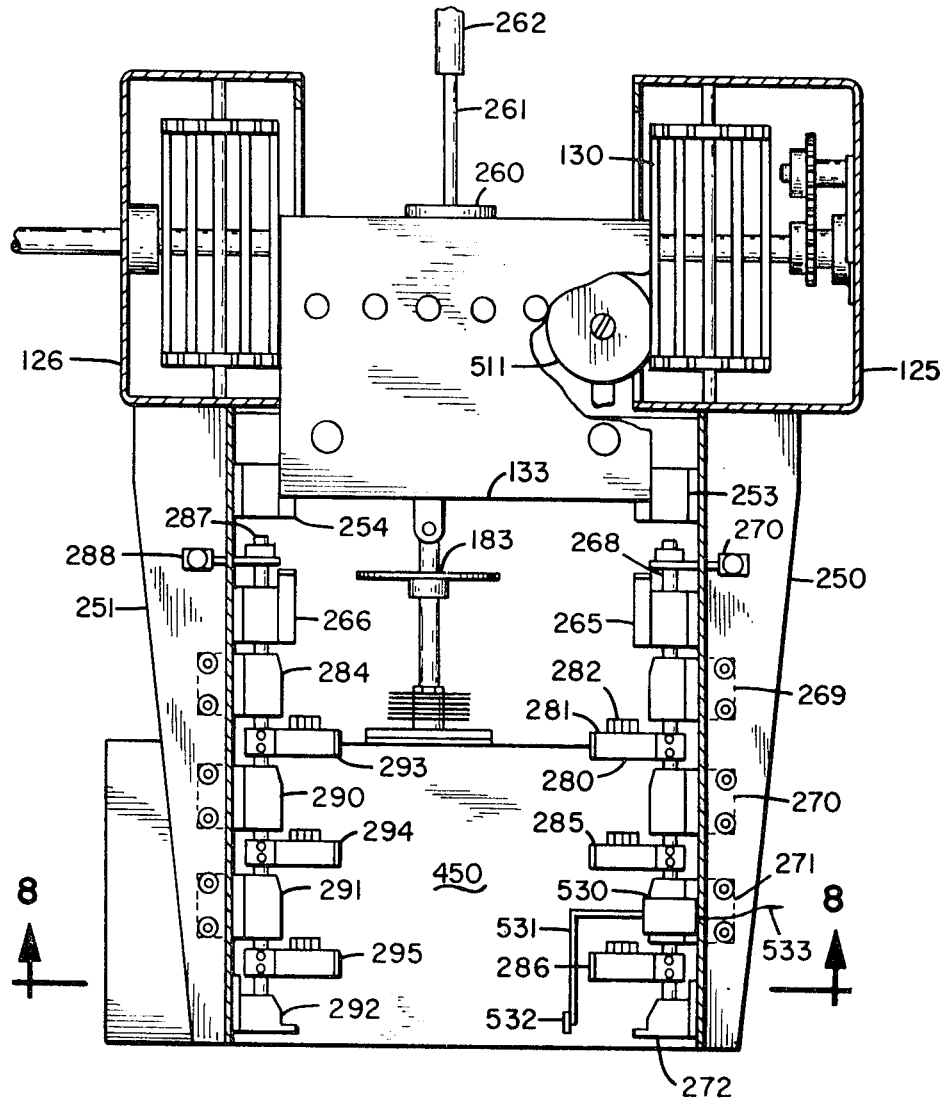
FIG. 7 is a fragmentary top view taken along lines 7—7 of FIG. 1 showing the battery cover dispensing mechanism and guides.
Figure 8:
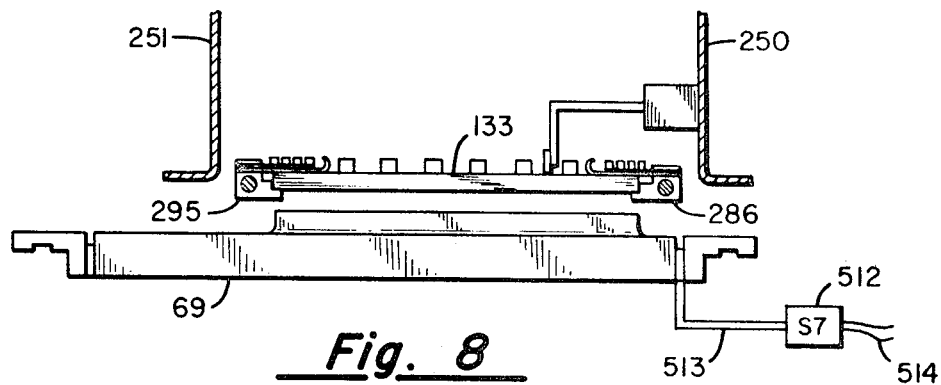
FIG. 8 is a fragmentary front view taken along lines 8—8 of FIG. 7 showing the heating platen, the cover lowering device and the cover.

Referring to FIG. 7 and FIG. 8, FIG. 7 shows a slidable cover dispensing mechanism in a fragmentary top view and partially in section and FIG. 8 shows the cover dispensing mechanism in fragmentary end view and partially in section.

Attached to upright arm 125 is a support bracket 250 that contains a number of support guides for one end of battery cover 133 and attached to upright arm 126 is a similar support bracket 251 that contains a number of support guides for the other end of the battery cover 133. Attached to bracket 250 is a first cover guide member 253 and attached to bracket 251 in an oppositely disposed manner is a second cover guide member 254. Guide members 253 and 254 coact to support cover 133 along the bottom and side edges of the cover as it is pushed from between the channel shaped cover supports 131 and 141 by a pusher 260 having an extendible arm 261 that is linearly displaceable by application of a pneumatic signal at cylinder 262. Supports 253 and 254 having an L-shaped appearance so as to vertically and horizontally guide cover 133 as it leaves the cover chain holder.

Similarly, a cover guide support member 265 fastens to bracket 250 and located in an oppositely disposed manner in support bracket 251 is a similar cover guide support member 266. These guides are rigidly mounted on bracket 250 and 251 to provide horizontal and vertical support for cover 133 similar to supports 253 and 254. In addition to the horizontal and vertical guide members, support bracket 250 contains three vertical guide members 269, 270 and 271 for guiding one edge of cover 133. Similarly, support bracket 251 contains three vertical guide members 289, 290 and 291 for guiding the opposite edge of cover 133.

Rotatably mounted in guide support member 265 and an end stop guide support member 272 is a shaft 268 having a lever mechanism 270 rigidly affixed thereto. Lever mechanism is movable upward by displacement of a rod affixed to a piston within cylinder 249 (FIG. 1).

Similarly, rotatably mounted in a guide support member 266 and an end stop guide support member 292 is a rotatable shaft 287 having a lever mechanism 288 that is also activable upward through a mechanism (not shown) that mechanically connects lever mechanism 288 to lever mechanism 270 so that displacement of one lever mechanism produces a corresponding displacement of the other. Rigidly attached to shaft 268 is a first top and bottom cover guide 280, a second top and bottom cover guide 285 and a third top and bottom cover guide 286. Similarly, rigidly attached to shaft 287 is a first top and bottom cover guide 293, a second top and bottom cover guide 294 and a third top and bottom cover guide 295. These cover guides coact to support cover 133 on opposite ends. Top and bottom cover guide 280 comprises a spring leaf 281 and a series of upwardly curved members 282. The upwardly curved members 282 prevent the edge of cover 133 from catching on cover guide 280 and thus guide cover 133 smoothly between the top and bottom cover guides. As the remaining top and bottom cover guides are identical they will not be described. The top and bottom cover guides attached to shaft 268 are rotatable in a counterclockwise manner and the top and bottom cover guides attach to shaft 287 and are rotatable in a clockwise direction. As the guide members rotate the spring leaf spreads apart slightly allowing cover 133 to slip from between the top and bottom cover guides and on to heating platen 69.

In summary, a cover slides from between the channel supports and along a number of guide members until it reaches a frontal position in the cover dispensing unit 12. Then a pair of shafts holding the cover support guide members are rotated causing the cover to drop onto a heating platen where the cover is ready to be preheated for sealing onto the battery container.

Figure 9:
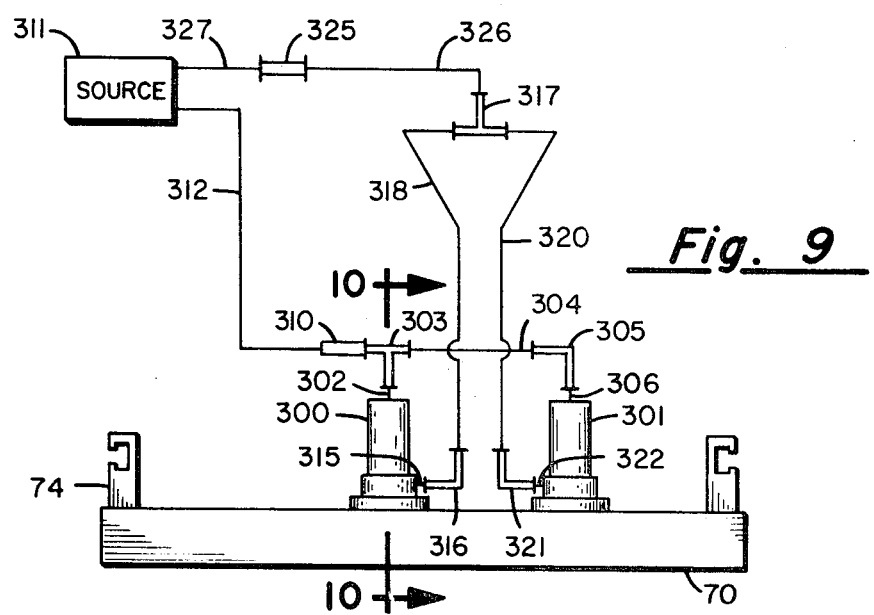
FIG. 9 is a view, partially in schematic, of our cover holding mechanism.
Figure 10:
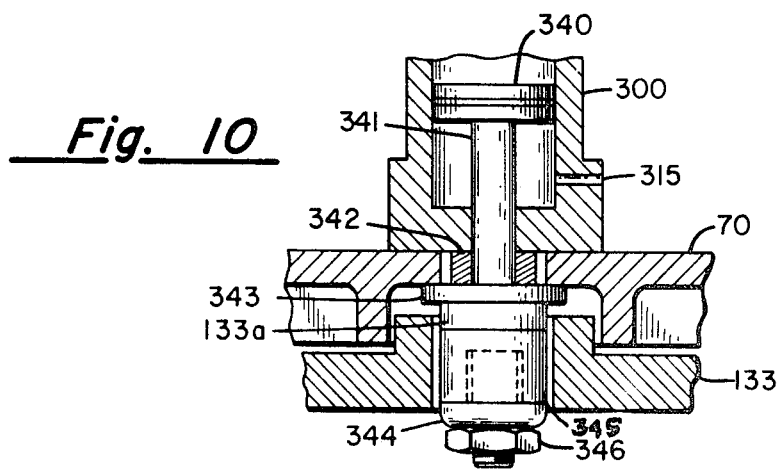
FIG. 10 is a cross-sectional view taken along lines 10—10 of FIG. 9 showing the mechanism for grasping the battery cover.

FIGS. 9 and 10 show in greater detail cover holder 70 for lifting cover 133 from heating platen 69 after the cover has been heated so as to be in a fusible condition. Located on top of cover holder 70 is a first pressure actuated cylinder 300 and a second pressure actuated cylinder 301. Cylinder 300 has a flexible tubing 302 connected thereto that attaches to a T-connector 303. One side of T-connector 303 connects to a flexible tubing 306 on top of cylinder 301 through a flexible tubing 304 and an elbow 305. The other side of T-connector 303 connects to a quick disconnect connector 310. Connector 310 connects to a fluid source 311 through a flexible tubing 312. Similarly, a lower flexible tubing 315 on cylinder 300 connects to an elbow 316 that connects to a T-connector 317 through a flexible tubing 318. The other side of T-connector 317 connects to cylinder 301 through a flexible tubing 320, an elbow 321 and a flexible tubing 322. T-connector 317 connects to a quick disconnect connector 325 through a flexible tubing 326. The other end of connector 325 connects to fluid source 311 through a flexible tubing 327. Source 311 is adaptable to supply fluid under pressure to top tubing 302 on cylinder 300 and to top tubing 306 on cylinder 301. Because tubing 302 and tubing 306 are connected by a common tubing 312, it ensures that fluid pressure within the pressure actuated cylinders 300 and 301 are equal thus producing equal displacement forces on the pistons within the cylinders. Likewise, source 311 is also adaptable to supply fluid under pressure to tubing 322 on cylinder 301. Similarly, tubing 315 and tubing 322 are connected by common tubing 327. This ensures that fluid pressure within the lower portions of cylinders 300 and 301 are equal thus producing equal displacement forces on the pistons within the cylinders so that the pneumatically actuated pistons (not shown) in cylinders 300 and 301 act in unison in response to the signal from source 311.

FIG. 10 shows an enlarged section view of cylinder 300 taken along lines 10—10 of FIG. 9. Located within cylinder 300 is a piston 340 connected to an extendible rod 341 which is threaded at the lower end. Rod 341 extends through an opening 342 in cover holder 70 and through a washer 343 located adjacent the top of the cover holder 70. Rod 341 extends through a radially expandable rubber retainer bushing 345 and a nut 346 secures retainer bushing 345 to rod 341. FIG. 10 shows battery cover holder 70 in the release position. In this release position battery cover 133 fits loosely in cover holder 70. When it is desired to securely grasp battery cover 133, a pressure signal is applied at tubing 315 which pushes upward on piston 340 and rod 341 thereby forcing rubber retainer bushing 345 against washer 343 causing it to expand radially outward. A sleeve (not shown) within bushing 345 prevents extreme upward travel of rod 341 thus ensuring a maximum uniform radial expansion of bushing 345. The radial expansion of rubber retainer bushing 345 produces an interference fit between the vent hole of battery cover 133 and bushing 345 thereby securely holding battery cover 133 in cover holder 70. As bushing 345 expands it forces boss 133a on cover 133 against washer 343. This ensures that cover 133 is held flat in cover holder 70 so that it can be fitted onto the battery container in a good sealing relation. Because cylinder 301 and its mechanism for grasping a second vent hole is identical to cylinder 300 and its mechanism, the mechanism of cylinder 300 will not be described.

MECHANICAL OPERATION OF THE COVER DISPENSING UNIT

AND HEAT SEALING UNIT

Referring to the drawings, the operation of cover dispensing mechanism 12 and heat sealing system 11 will now be described further. For ease in understanding the operation of the system only the mechanical steps performed will now be explained. Later the electrical circuitry for operating the system will be described.

Briefly, the system includes means for sequentially performing a number of steps and further means for determining that the steps have been performed properly. The major steps in dispensing a battery cover and sealing it to a battery container are as follows:

First, positioning a battery container in heat sealing system 11.

Second, advancing a cover into a dispensing position.

Third, dispensing the cover onto a series of guide retainers.

Fourth, lowering the cover from the guide retainers onto the heating platen.

Fifth, sliding the heating platen and the cover into a position directly above the container.

Sixth, lowering a cover holder onto the cover on the heating platen and then lowering the heating platen onto the edges of the container.

Seventh, heating the edges of the container and the edges of the cover to a fusible condition.

Eighth, raising the cover holder and heating platen from the edges of the container and lifting the cover from the heating platen.

Ninth, sliding the heating platen rearward.

Tenth, bringing the heated edges of the cover into pressure contact with the heated edges of the container to produce a heat-fused joint between the cover and the container.

When these ten steps have been completed the battery container and the cover are sealed so as to form a leakproof acid-free joint therebetween.

In the first step pressure actuated mechanism 45 pushes battery container 36 against ridge 34 on back plate 29 and against stop 35. When battery container 36 is properly orientated against ridge 34 it actuates a switch 507 and sends a signal to control station 506 through a conduit 508 that the battery container 36 is properly orientated so that the next step can be performed. An operator can then manually or through an automatic system initiate the second step.

The second step to occur is advancing a cover to a dispensing position within cover dispensing mechanism 12 by rotating chain 141 and chain 130 through previously described mechanism 143 and mechanism 160. However, it would be useless to rotate chain 140 and chain 141 if there were no covers between cover holder channel 142 and cover holder channel 131 of chain 141 and chain 130. Therefore, there is provided a switch 500 (FIG. 3) having a lever arm 501 that is normally held in the downward position when there is a cover present between chain 130 and chain 141. If no cover is present, arm 501 on switch 500 swings upward thereby transmitting a signal through a conduit 505 to control station 506 alerting an operator through an audible or visual alarm (not shown) that a new supply of covers should be placed in cover dispensing mechanism 12. Assuming that there are covers within dispensing mechanism 12, it is also necessary to determine whether these covers are properly orientated in cover dispensing mechanism 12 so that the offset openings for the battery terminal posts will fit over the battery terminal posts when the cover is brought into pressure contact with container 36. In order to determine if the covers are properly orientated there is provided a photoelectric eye 510 (FIG. 1 and FIG. 2) that is both a source and a detector. If the covers are properly aligned, the photoelectric eye transmits a light signal through the opening in the battery cover for the negative terminal post and against a reflector 511 (FIG. 7) which is in vertical alignment with photoelectric eye 510. The light signal reflects from reflector 511 into the detector located in photoelectric eye 510. If the covers are not properly aligned, a signal is transmitted through conduit 515 to control station 506 thereby alerting an operator through an audible or a visual alarm (not shown) in control station 506 that the covers are not properly aligned.

Assuming that there are covers within cover dispensing mechanism 12 and that the covers are properly aligned, the second step can be performed. Namely, rotating chain 141 and chain 130 bringing cover into a position where it can be readily dispensed from covering dispensing mechanism 12 onto a series of guide retainers.

Referring to FIG. 7, in the third step a cover is pushed from between U-shaped cover holding channel 131 and U-shaped cover holding channel 141 by a pusher 260 connected to an extendable rod 261 located in pneumatic cylinder 262. By application of a pressure signal at pneumatic cylinder 262 from a pressure source (not shown) causes rod 261 to extend forward. As rod 261 extends forward it slides cover 133 forward along guide members 254, 253, 289, 265, 290 and 280 until the front of the cover 133 abuts against stops 292 and 272. In order to determine whether the cover is in an abutting relation with stop 292 and stop 272, there is provided a switch 530 having a lever arm 531 and a roller 532 located on the end of arm 531. If cover 133 is in an abutting relation with stop 292 and stop 272 it pushes upward on switch 530 (FIG. 7) thereby transmitting a signal through a conduit 533 to control station (not shown) that the next step can be performed as the cover is positioned properly against stop 292 and stop 272. After cover 133 is located in an abutting relation with stop 272 and stop 292, the cover 133 is ready to be placed on heating platen 69. To determine whether heating platen 69 is properly positioned there is provided a switch 512 (FIG. 8) having an arm 513. If heating platen 69 is properly positioned so as to receive a cover, it actuates arm 513 of switch 512. If heating platen 69 is not properly orientated to receive a cover, a signal is transmitted from switch 512 through a conduit 514 to control station 506 indicating that heating platen 69 is not properly orientated and thus preventing the continuation of the cycle. Once cover 133 and heating platen 69 have been properly positioned then the fourth step can be performed. In the fourth step application of a signal at cylinder 249 moves member 540 upward. Member 540 is mechanically connected to shaft 268 and shaft 287 so that upward movement of arm 540 rotates shaft 268 and shaft 287 pushing the cover downward onto heating platen 69. As member 540 moves upward it pushes a roller 541 on a lever arm 543 that is connected to a switch 542 upward. This sends a signal through a conduit 545 to control station 506 through an alarm (not shown) indicating that the cover has been pushed onto heating platen 69. After the cover has been pushed onto heating platen 69, application of a second pneumatic signal extends member 540 downward thereby bringing a roller 550 connected to a switch 551 through a lever arm 552 downward. If the second pneumatic signal failed to engage switch 551, it would transmit a signal through conduit 553 to control station 506 indicating that there was a malfunction and that the cover holding arms 292, 294, 281, 285, 286 and 295 had not been returned to a position to receive another cover from cover dispensing mechanism 12. In order to determine if cover holder 70 is in a proper position, there is provided a switch 101 having roller 103 connected thereto through lever arm 102. If lever arm 102 is not in a downward position because the slidable member 16 is not in a proper position, a signal is transmitted through a conduit 104 to control station 506 that cover holder 70 is properly positioned for the next operation.

Assuming that the cover is properly positioned, the fifth step can now be performed. In the fifth step application of pneumatic signal to a cylinder (not shown) causes a rod and a clevis 570 (FIG. 7) to extend forward sliding heating platen 69 forward along rail 450 and rail 449 of movable platen carrier 18. Located at the front of movable platen carrier 18 is a switch 560 (FIG. 6) having an arm 561. A bracket 562 holds switch 560 to movable platen carrier 18 so when the heating platen 69 is properly positioned in front of movable platen carrier 18 the next step can then be performed. In addition, it is necessary to determine if slidable member 16 is in a proper position. To do so there is provided a switch 101 having a roller 103 on arm 102 that is held downward by the underside of holder 81 when slidable member 16 is in the proper position. If slidable member 16 were not in a proper position, switch 101 would transmit a signal through conduit 104 to control station 506 to indicate that slidable member 16 was improperly positioned.

Assuming that heating platen 69 is properly positioned and that slidable member 16 is properly positioned, the sixth step can now be performed. In the sixth step application of a pneumatic signal at hose connection 86 of cylinder 85 causes shaft 88 to extend downward thereby pushing slidable member 16 and cover holder 70 into contact with cover 133 located on heating platen 69. Shaft 85 is extended further downward and pushes top slidable member 16 and movable platen carrier 18 downward thereby bringing heating platen 69 into contact with the top edges of the battery container.

Once heating platen 69 is in contact with the edges of the container and the edges of the cover, the seventh step can be performed, namely, forcing the cover and the container into pressure contact with the heating platen 69. Heating platen 69 is continuously maintained at a temperature of approximately 375°–400° F. In order to melt the edges of the cover and the edges of the container, heating platen 69 is forced into pressure contact with the edges of the cover and the edges of the container. This rapidly increases the heat conduction between the cover and the container thus raising the temperature of the edges of the cover and the container until they are in a semimolten or fusible condition.

When the edges of the cover and the container have reached a semimolten state the eighth step can be performed, namely, raising heating platen 69 from the top of the container by application of a pneumatic signal at hose connection 87 of cylinder 110.

After heating the edge of the cover, the ninth step can now be performed, namely, applying a pneumatic signal to actuate cover holder cylinder 300 and cover holder cylinder 301 thereby enabling the cover holder 70 to lift the cover from heating platen 69. After the cover is lifted from the heating platen 69 it is slid from beneath cover holder 70 toward the rear of sealing unit 11 along rail 450 and rail 449. Before the tenth step can be performed a switch (not shown) located on the back of rail 451 must be actuated to indicate that heating platen 69 is not below cover holder 70. If heating platen 69 was not properly orientated, control station 506 would prevent the continuation of the sealing process.

Assuming that heating platen 69 is properly positioned at the rear of sealing unit 11, the tenth step can now be performed, namely, applying a pneumatic signal at hose connection 86 of cylinder 85 and connection 113 to cylinder 110 causing slidable member 16 and 15 to be lowered. As slidable member 16 is lowered it brings the semimolten edges of the container and the cover into pressure contact and then allows the edges of the cover and container to cool to produce a heat fused joint between the cover and the container.

Thus it can be seen there has been provided means for containing a number of covers and selectively dispensing one of the covers onto a heating platen and means for providing proper orientation of the cover with respect to the heating platen and the container. There also is provided interlocks in the system to determine whether certain of the steps have been properly performed in order to allow a subsequent step to be performed.

DESCRIPTION OF ELECTRICAL CIRCUITRY

Figure 13:
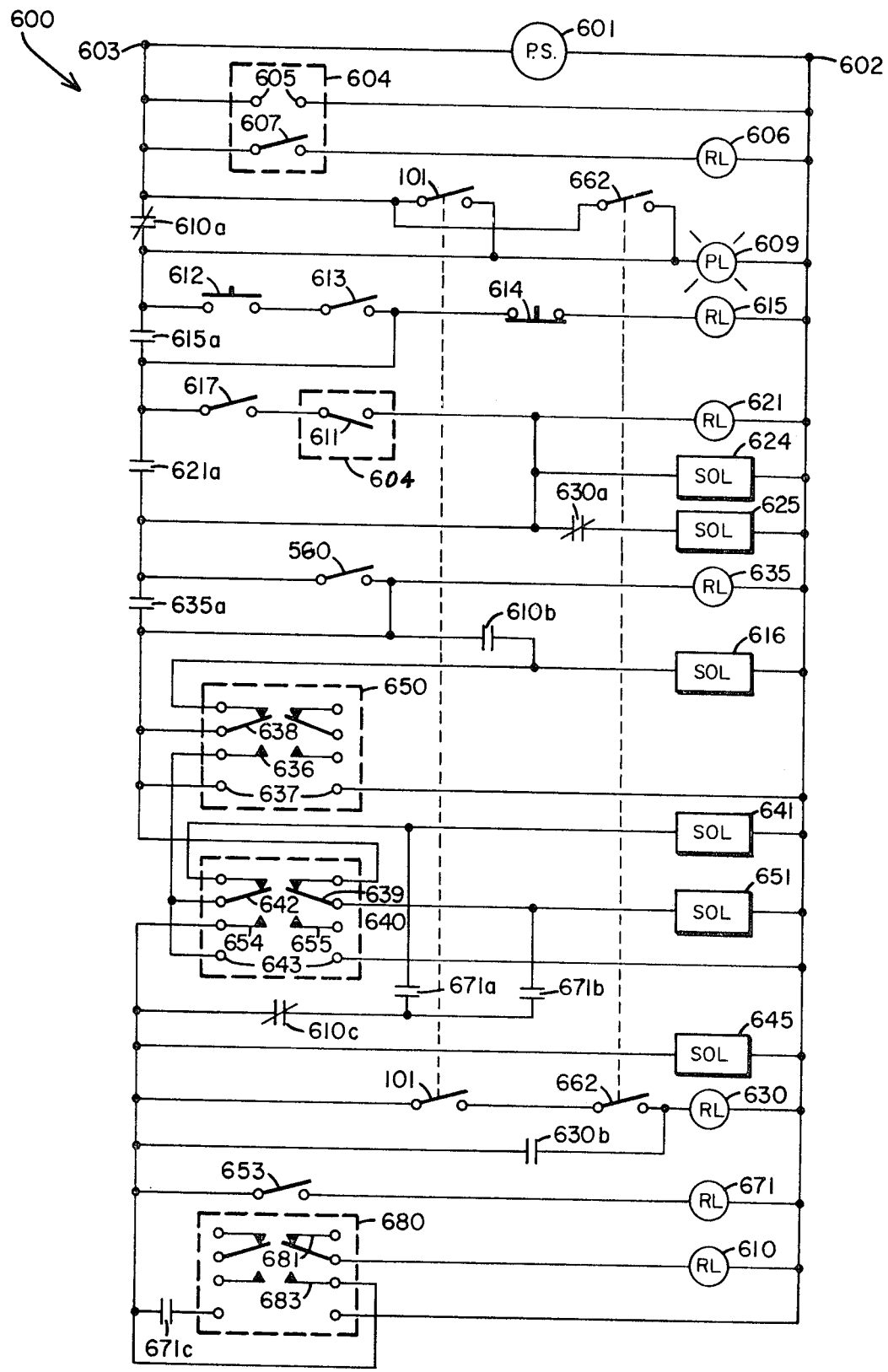
FIG. 13 is an electrical schematic of a circuit for automatically operating the heat sealing unit.

Referring to FIG. 13, reference numeral 600 designates a schematic of the electrical circuitry capable of operating heat sealing mechanism 11. The circuit has been simplified for ease in comprehending so as to include only the electrical operation of the heat sealing system, however, it will be apparent to those skilled in the art that similar circuitry could be added so as to include the operation of the cover dispensing mechanism. Circuit 600 would normally be mounted within control station 506 (FIG. 1).

Briefly, the circuit provides means for sequentially powering a series of relays and solenoids in a predetermined manner to perform the necessary steps to heat seal a battery cover to a container.

FIG. 13 shows a power supply 601 that produces a 120-volt 60-cycle signal to a first terminal 602 and a second terminal 603. The signal at terminals 602 and 603 powers a conventional temperature controller 604 through a set of terminals 605.

Located within temperature controller 604 is a switch 607 that connects to a temperature sensing thermo-couple 470 in heating platen 69. When the power is applied to temperature controller 604 it actuates a circuit (not shown) that closes switch 607, if heating platen 69 is below a predetermined temperature, thus powering relay 606.

Activation of relay 606 closes a pair of high amperage heater contacts (not shown) thus supplying power to heating cartridges 460a through 464a which are located in heating platen 69 (FIG. 12). Also, power is applied to an indicator light 609 through normally closed relay contacts 610a thus indicating that the temperature controller 604 and the first portion of circuit 600 are in the powered condition. (Hereinafter the relays will be designated by a reference numeral and the contacts associated with that relay will be designated with the same reference numeral followed by an arabic letter.)

The cartridge heaters continue to heat platen 69 until a predetermined temperature is reached which activates and closes a lower temperature limit switch 611 in temperature controller 604 thus preparing the circuit for a later step.

To initiate the mechanical operation of heat sealing unit 11, an operator momentarily pushes a switch 612 (FIG. 3), which applies power across closed end stop switch 613 (FIG. 1). With a battery container properly positioned in station 11, switch 613 will be held in the closed position allowing power to be applied to relay 615 through emergency stop switch 614. The purpose of emergency stop switch 614 is to allow an operator to quickly stop the operation of the heat sealing unit if something should malfunction. Switch 612 is shown as being mechanically actuable. However, those skilled in the art well recognize it could equally well be brought to a closed position by a signal from the cover dispensing circuit (not shown). The powering of relay 615 closes the normally open contacts 615a thus locking relay 615 in the powered or on condition and sets up the next operation while also proving the first condition has been performed, namely, that the container is properly positioned so that end stop switch 613 is in the closed position. If a cover is properly positioned on platen 69, switch 617 will be in the closed position allowing power to be applied to relay 621 through switch 611 in temperature controller 604. It will be recalled that switch 611 is maintained in the closed position as long as heating platen 69 is maintained at a temperature which exceeds a predetermined level. Thus, relay 621 can not be actuated until the circuit proves that the heating platen 69 is above the predetermined temperature. With switch 611 in the closed position, power is applied across relay 621, solenoid 624, normally closed relay 630a and solenoid 625. The application of power to relay 621 closes normally open contact 621a thus locking relay 621 in the powered condition. The signal at solenoid 624 activates a pneumatic valve (not shown) that supplies a pneumatic signal to mechanism 45 (FIG. 1) which locks container 36 into heat sealing unit 11. The powering of solenoid 625 opens a valve (not shown) that applies a pneumatic signal to pneumatic cylinder 183 (FIGS. 1 and 7) and which pushes heating platen 69 and the cover forward in heat sealing unit 11. With a continuous signal at solenoid 624 it ensures that container 36 is held securely during the heat seal operation while the signal at solenoid 625 ensures that platen 69 is pushed to the forward condition over container 36. In series with solenoid 625 are normally closed relay contacts 630a that can be opened later on to allow the heating platen to move rearward.

The actuation of solenoid 625 causes platen 69 to move forward until it is properly positioned in the heat sealing station 11. If heating platen 69 is properly positioned it closes switch 560 thus powering relay 635 which closes relay contact 635a and thus locks relay 635 in the powered condition while also applying power to a timer 650 through contacts 637. At the same time that timer 650 receives power solenoid 616 also receives power through a closed switch 638 in timer 650. Also, power is applied through a closed switch 639 in a timer 640 to power a solenoid 651. The powering of solenoid 651 applies a pressure signal to hose connection 86 in cylinder 85 thus forcing top member 16 downward until heating platen 69 is in pressure contact with the edges of cover 133. In this position heat is rapidly transferred to the edges of the cover. The purpose of timer 640 and timer 650 is to provide predetermined time delays to allow the cover and the container to be heated to a fusible condition. Timer 650 provides a preheating of approximately 2 seconds duration to cover 133 before switch 638 closes to power timer 640.

Typically, timer 650 is preset for a 2 second interval, although this is given by way of illustration with no limitation intended thereto. After the 2 second delay, switch 638 moves downward into contact with terminal switch 636 thus depowering solenoid 616 powering timer 640 and powering solenoid 641. The depowering of solenoid 616 transmits a signal to cylinders 300 and 301 which locks cover 133 onto cover holder 70. As previously mentioned, switch 638 contacts terminal switch 636, thereby transmitting a signal through switch 642 in timer 640 to power solenoid 641. The powering of solenoid 641 applies a pressure signal to hose connection 113 of cylinder 110 thus forcing bottom member 15 downward until the bottom side of heating platen 69 is in pressure contact with the edges of container 36. In this position, heat is rapidly transferred to the edges of the container from heating platen 69. After a predetermined time interval has elapsed, switches 642 and 639 in timer 640 move downward into contact respectively with switches 654 and switches 655. Typically, this time may be 10 seconds or the like, however, this is given by way of example and no limitation is intended thereto. As switches 642 and switches 639 are moved into contact with terminal switches 654 and 655, the signal is removed from solenoid 651 and solenoid 641. This releases the pressure in cylinder 85 and cylinder 110 thus allowing the top member 16 and bottom member 15 to move toward the extended position as shown in FIG. 1.

Also, as switch 642 moves to the downward position, it powers a solenoid 645 which activates a mechanism (not shown) for supplying a higher pressure signal to top cylinder 85 and bottom cylinder 110. This higher pressure signal allows bottom member 15 and top member 16 to be brought quickly together when solenoid 641 and 651 are reactivated for the heat sealing operation. When bottom member 15 and top member 16 are in the extended position shown in FIG. 1, they close the double pole, double acting switches 101 and 662 which are located respectively on top member 16 and bottom member 15. The purpose of the double pole, double acting switches 101 and 662 is to prevent relay 630 from being prematurely activated which would open relay contacts 630a thus depowering solenoid 625 which would push platen 69 rearward before it had cleared top member 16. Also, switch 101 and 662 prevent relay 609 from being depowered prematurely when timer 680 resets the circuit at the end of the heat sealing operation. With switches 101 and 662 in the closed position (i.e. the top member 16 and bottom member 15 in the retracted position shown in FIG. 1), power is applied to relay 630 which closes relay contacts 630b thus locking relay 630 in the powered condition. Powering relay 630 also opens normally closed relay contacts 630a thus depowering solenoid 625 which then sends a pneumatic signal to initiate rearward motion of platen 69. When platen 69 reaches the rearward position, it actuates a switch 512. With switch 653 in a closed position, power is applied to relay 671 which closes normally open contacts 671a, 671b and 671c. Closing relay contacts 671a and 671b applies power to solenoid 651 and solenoid 641 which causes top member 16 and bottom member 15 containing respectively cover 133 and container 36, to quickly move into a sealing relationship in heat sealing unit 11. The closing of relay contacts 671c also applies power to timer 680 so that after a predetermined time has elapsed, switch 681 on timer 680 moves downward contacting terminal switch 683 which applies power to relay 610. The purpose of relay 610 is to open and close relay contacts that will reset circuit 600 to repeat the heat sealing operation. The application of power to relay 610 opens normally closed relay contacts 610a and closes normally open relay contacts 610b. Closing normally open relay contact 610b powers solenoid 616 thus releasing cover 133 from cover holding mechanism 70. Also, opening normally closed relay contact 610c depowers solenoid 651 and 641 which allows bottom member 15 and top member 16 to move to the retracted position shown in FIG. 1. However, in order to prevent the opening of relay contacts 610a from resetting the circuit before top member 16 and bottom member 15 have been retracted to the position shown in FIG. 1, there are provided switches 101 and 662 that remain in the closed position until bottom member 15 and top member 16 reach the extended positions shown in FIG. 1. This ensures that circuit 600 will not be depowered or reset until the entire heat sealing operation has been completed.

The embodiments of the invention in which an exclusive property or privilege is claimed are defined as follows:

1. An apparatus for holding and dispensing a plurality of battery covers adapted to be heat sealed to a container comprising: movable battery cover support means having a pair of oppositely disposed members for supporting the battery cover on at least two edges in a spaced predetermined relation; means operative to advance said movable cover support means into a position whereby one of said plurality of battery covers is adapted to be dispensed from said movable means; cover guide members located in a spaced predetermined relation and operable to slidably receive a cover from said movable cover support means; and further means operable to dispense one of said battery covers from said movable battery cover support means onto said cover guide members.

2. The apparatus of claim 1 wherein said pair of oppositely disposed members for supporting the battery cover on at least two edges comprises a pair of continuous chains having oppositely disposed U-shaped channel members for supporting opposite ends of said plurality of battery covers.

3. The apparatus of claim 1 wherein said means operative to advance said movable cover support means comprises: a pair of pressure actuated members: a first slidably mounted gear rack connected to one of said pressure actuated members, said gear rack having a dog thereon for engaging one of said pair of oppositely disposed members; a second slidably mounted gear rack connected to the other of said pressure activated members, said gear rack having a dog thereon for engaging the other of said pair of oppositely disposed members; and a member adaptable for engaging said first gear rack and said second gear rack so as to maintain equal displacement of said first gear rack and said second gear rack upon actuation of said pressure actuated members.

4. The apparatus of claim 1 wherein said further means operable to dispense one of said battery covers comprises: a pressure actuated member having a linearly extendable arm for sliding one of said covers onto said cover guide members.

5. The apparatus of claim 2 wherein each of said pair of continuous chains includes a first set of sprocket wheels rotatably mounted for engaging said chain and a second set of resiliently, rotatably mounted sprocket wheels for engaging and maintaining said chain in tension.

6. The apparatus of claim 2 including means operable to determine if there is a cover present in said oppositely disposed members for supporting a battery cover.

7. The apparatus of claim 2 wherein said apparatus includes rotatably mounted cover guide members operable to position a battery cover dispensed from said apparatus.

8. The apparatus of claim 2 wherein said apparatus includes a pair of end stop members for restraining movement of a battery cover dispensed from said apparatus.

9. The apparatus of claim 2 including: first means for holding a battery container having edges adapted to be heat sealed in a predetermined location; second means for receiving and positioning a battery cover having edges adapted to be heat sealed to said container; third means for heating the edges of said battery container and the edges of said battery covers to a fusible condition; and fourth means for bringing the fusible edges of said battery cover into pressure contact with the fusible edges of said container thereby producing a fused joint therebetween.

10. The apparatus of claim 9 wherein said battery container and said battery cover comprise a heat fusible thermoplastic material.

11. The apparatus of claim 10 wherein said means for positioning a battery cover includes a member slidable laterally along a set of vertically displaceable rails.

12. The apparatus of claim 11 wherein said member comprises a heating platen for heating the edges of said battery container and the edges of said battery cover.

13. The apparatus of claim 12 including pressure actuated means for lifting said battery cover from said heating platen.

14. The apparatus of claim 13 including pressure actuated means for sliding said heating platen from beneath said cover.

15. The apparatus of claim 14 wherein said heating platen comprises cartridge heaters placed in a spaced relation in said platen for producing and maintaining a uniform temperature in said heating platen.

16. The apparatus of claim 9 wherein said first means for holding a battery container includes a logic circuit.

17. The invention as described in claim 16 wherein said logic circuit comprises a plurality of relays for selectively activating said first means, said second means, said third means and said fourth means.

18. The invention as described in claim 17 wherein a plurality of interlock switches are provided for insuring that each of said means has properly performed their respective functions.

19. The invention as described in claim 18 wherein a timer is provided for insuring that the fusible edges of the container and the cover are maintained in pressure contact for sufficient time to produce a leakproof heat sealed joint between said cover and said container.

20. The invention as described in claim 19 wherein a plurality of solenoids are provided for selectively activating each of said first means, said second means, said third means, and said fourth means.

* * * * *